(12) United States Patent
Lee

(10) Patent No.: US 8,974,907 B2
(45) Date of Patent: Mar. 10, 2015

(54) METHOD FOR REINFORCING A GLASS OF TOUCH PANEL AND REINFORCEMENT STRUCTURE THEREOF

(71) Applicants: Pal Wonn (Taiwan) Co., Ltd., Taoyuan Hsien (TW); Chun-Yuan Lee, Hsinchu (TW)

(72) Inventor: Chun-Yuan Lee, Hsinchu (TW)

(73) Assignees: Pal Wonn (Taiwan) Co., Ltd., Taoyuan Hsien (TW); Chun-Yuan Lee, Hsinchu (TW)

( * ) Notice: Subject to any disclaimer, the term of this patent is extended or adjusted under 35 U.S.C. 154(b) by 55 days.

(21) Appl. No.: 13/900,217

(22) Filed: May 22, 2013

(65) Prior Publication Data

US 2013/0273334 A1 Oct. 17, 2013

Related U.S. Application Data

(62) Division of application No. 13/446,578, filed on Apr. 13, 2012, now Pat. No. 8,784,597.

(51) Int. Cl.
| C03C 17/34 | (2006.01) |
| C03C 17/42 | (2006.01) |
| C03C 17/44 | (2006.01) |

(52) U.S. Cl.
CPC ............ C03C 17/34 (2013.01); C03C 17/3405 (2013.01); C03C 2217/231 (2013.01); C03C 17/44 (2013.01); C03C 2218/355 (2013.01)
USPC .............. 428/426; 428/189; 428/68; 428/354

(58) Field of Classification Search
None
See application file for complete search history.

(56) References Cited

U.S. PATENT DOCUMENTS

| 4,026,826 | A | | 5/1977 | Yoshida et al. |
| 4,284,677 | A | * | 8/1981 | Herliczek ..................... 428/192 |
| 4,780,512 | A | | 10/1988 | Gould et al. |
| 6,896,928 | B2 | * | 5/2005 | Allaire et al. ................. 427/154 |
| 2002/0136907 | A1 | * | 9/2002 | Weber et al. .................... 428/442 |
| 2008/0187721 | A1 | * | 8/2008 | Engl ............................. 428/172 |
| 2010/0243908 | A1 | * | 9/2010 | Shoji et al. ............... 250/370.11 |
| 2012/0120364 | A1 | * | 5/2012 | Wu et al. ....................... 349/153 |
| 2012/0135229 | A1 | | 5/2012 | Sawazaki et al. |

FOREIGN PATENT DOCUMENTS

JP 03056166 A 3/1991

OTHER PUBLICATIONS

English Abstract of JP 03-056166 (Jul. 25, 2013).

* cited by examiner

*Primary Examiner* — David Sample
(74) *Attorney, Agent, or Firm* — C. G. Mersereau; Nikolai & Mersereau, P.A.

(57) ABSTRACT

The present invention provides a method for reinforcing a glass of a touch panel and a reinforcement structure thereof. The method provides at least one protective film and at least one glass substrate. One side of the glass substrate is adhered to one side of the protective film. The glass substrate adhered with the protective film is dipped in an adhesive reservoir. The glass substrate adhered with the protective film is taken out of the adhesive reservoir. After the adhesive is hardened, a reinforcement layer is formed on the other side and the periphery of the glass substrate. The present invention makes the surface of the glass to be more flat with an increased strength.

5 Claims, 6 Drawing Sheets

METHOD FOR REINFORCING A GLASS OF TOUCH PANEL AND REINFORCEMENT STRUCTURE THEREOF

CROSS-REFERENCE TO RELATED APPLICATIONS

The present application is a division of U.S. patent application Ser. No. 13/446,578, filed on Apr. 13, 2012, now U.S. Pat. No. 8,784,597 titled Method for Reinforcing a Glass of Touch Panel and Reinforcement Structure Thereof, listing Chun-Yuan Lee as inventor.

BACKGROUND OF THE INVENTION

1. Field of the Invention

The present invention relates to a method for reinforcing a glass of a touch panel and a reinforcement structure thereof, in which one side surface and the periphery of a glass substrate are formed with a reinforcement layer respectively to thereby reinforce the glass. In this way, the surface of the glass substrate can be made shining, smooth and flat very well.

2. Description of Prior Art

Recent years, touch panels have become more and more popular. In designing the touch panel, a surface of the touch panel is provided with a transparent glass plate for acting as a protective glass. In this way, the touch panel can be protected from suffering damage when it is touched or pressed.

The touch panel further comprises another transparent glass plate with a touch sensor function. Thus, in order to protect the glass plate, many manufacturers aim to develop different techniques for reinforcing the transparent glass plate.

As for the manufacturing process of the transparent glass plate, a large-sized transparent glass plate is cut into a plurality of small-sized transparent glass plates whose dimensions correspond to those of the final products of the touch panels. The existing techniques for cutting the transparent glass plate include a wheel scribing and breaking process, a laser scribing and breaking process, an etching and breaking process, a sand-blasting and breaking process, or the like.

However, the edges of the small-sized transparent glass plates after being cut have micro-cracks or chippings, which deteriorate the strength of the transparent glass plate. Therefore, when the transparent glass plate is mounted onto the touch panel, since the edges of the transparent glass plate are not reinforced, the transparent glass plate may suffer damage (such as creaks) easily after being collided or dropping to the ground. Therefore, it is an important issue for the manufacturers in this art to solve this problem.

SUMMARY OF THE INVENTION

In order to solve the above problem, an objective of the present invention is to provide a method for reinforcing a glass of a touch panel, whereby the strength of the glass can be increased greatly.

Another object of the present invention is to provide a method for reinforcing a glass of a touch pane, whereby the reduced of the glass can be reduced, and the surface of the glass can be made more flat, shining and smooth.

A further object of the present invention is to provide a reinforcement structure for a glass of a touch panel, wherein the strength of the glass can be increased greatly.

A still object of the present invention is to provide a reinforcement structure for a glass of a touch panel, wherein the glass can be made more flat, shining and smooth.

In order to achieve the above objectives, the present invention provides a method for strengthening a glass of a touch panel, including steps of: providing at least one protective film and at least one glass substrate; adhering one side of the glass substrate on one side of the protective film; dipping the glass substrate adhered with the protective film into an adhesive reservoir; taking the glass substrate adhered with the protective film out of the adhesive reservoir and waiting the adhesive to harden to thereby form a reinforcement layer on the other side and the periphery of the glass substrate. By this method, the micro-cracks or pores on the surface of the glass substrate can be filled to generate a more flat, shining and smooth surface. Further, the strength of the glass can be increased greatly.

The present invention further provides a reinforcement structure for a glass of a touch panel, including at least one glass substrate, at least one protective film and a reinforcement layer. The glass substrate is provided with a first side surface and a second side surface. The first side surface is arranged opposite to the second side surface and adhered to an adhesion surface of the protective film, thereby forming the reinforcement layer on the second side surface and the periphery of the glass substrate. By forming the reinforcement layer onto the glass substrate, the strength of the glass can be increased. Further, the second side surface can be made more flat, shining and smooth.

DETAILED DESCRIPTION OF THE INVENTION

Figure 1:
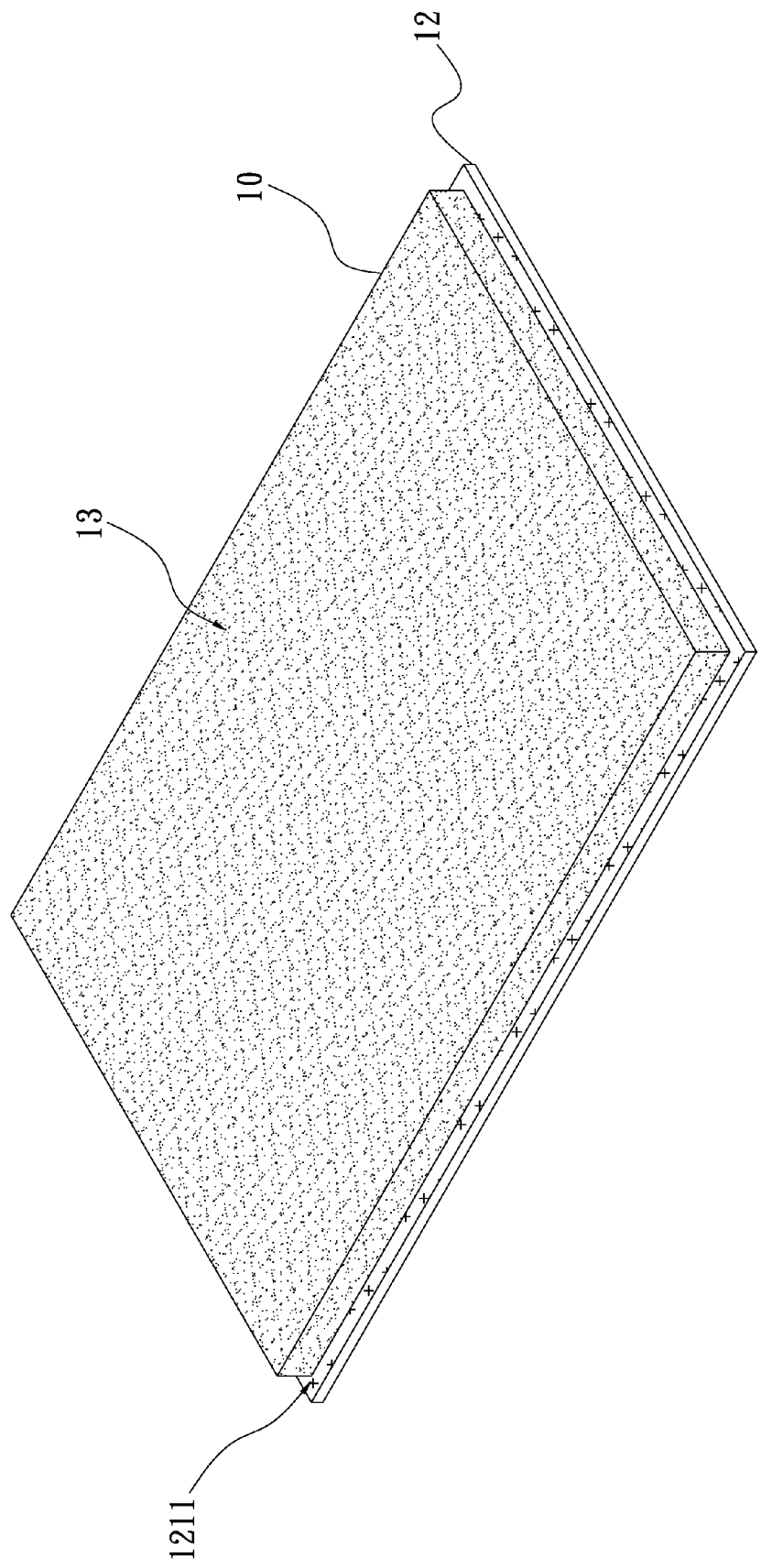
FIG. 1 is an assembled perspective view showing a first embodiment of the present invention.

The above objectives and structural and functional features of the present invention will be described in more detail with reference to preferred embodiments thereof shown in the accompanying drawings The present invention provides a method for reinforcing a glass of a touch panel and a reinforcement structure thereof. Please refer to FIGS. 1 and 2, which are an assembled perspective view and an exploded perspective view showing the first embodiment of the present invention respectively. The reinforcement structure of the present invention includes at least one glass substrate 10, at least one protective film 12 and a reinforcement layer 13. The glass substrate 10 is a glass substrate which may be subjected to a machining process (such as cutting) or not. In the present embodiment, the glass substrate 10 is subjected to a machining process, but it is not limited thereto. One glass substrate 10 is used as an example, but the number of the glass substrates 10 is not limited thereto. In the present embodiment, the user can change the number of the glass substrates 10 adhered with the protective film 12 based on practical demands.

The glass 10 is provided with a first side surface 101 and a second side surface 102 opposite to the first side surface 101. The protective film 12 is arranged opposite to the glass substrate 10 and has an adhesion surface 121. The adhesion surface 121 is adhered to the first side surface 101 of the glass substrate 10, thereby binding the glass substrate 10 and the protective film 12 together. The adhesion surface 121 has an adhesive layer 1211 which can be adhered repeatedly. The adhesive layer 1211 can be adhered on the first side surface 101 of the glass substrate 10 repeatedly.

Figure 3:
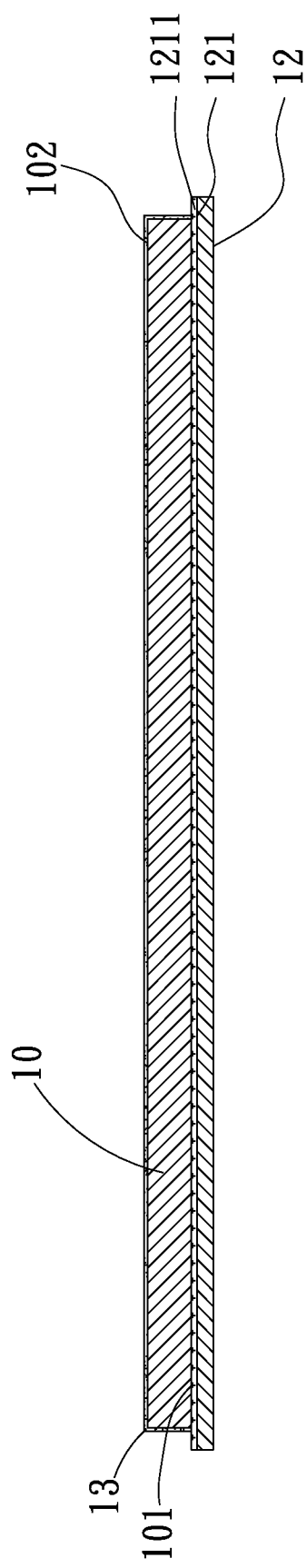
FIG. 3 is a cross-sectional view showing the first embodiment of the present invention.

In the present embodiment, the surface area of the protective film 12 is larger than the area of a surface of the glass substrate 10 to be adhered to the protective film 12. As shown in FIG. 3, the surface area of the protective film 12 is larger than the area of a surface of the glass substrate 10 to be adhered to the protective film 12. Further, the volume of the protective film 12 is larger than the volume of the glass substrate 10, but it is not limited thereto. The surface area of the protective film 12 may be equal to the area of a surface of the glass substrate 10 to be adhered to the protective film 12.

Figure 2:
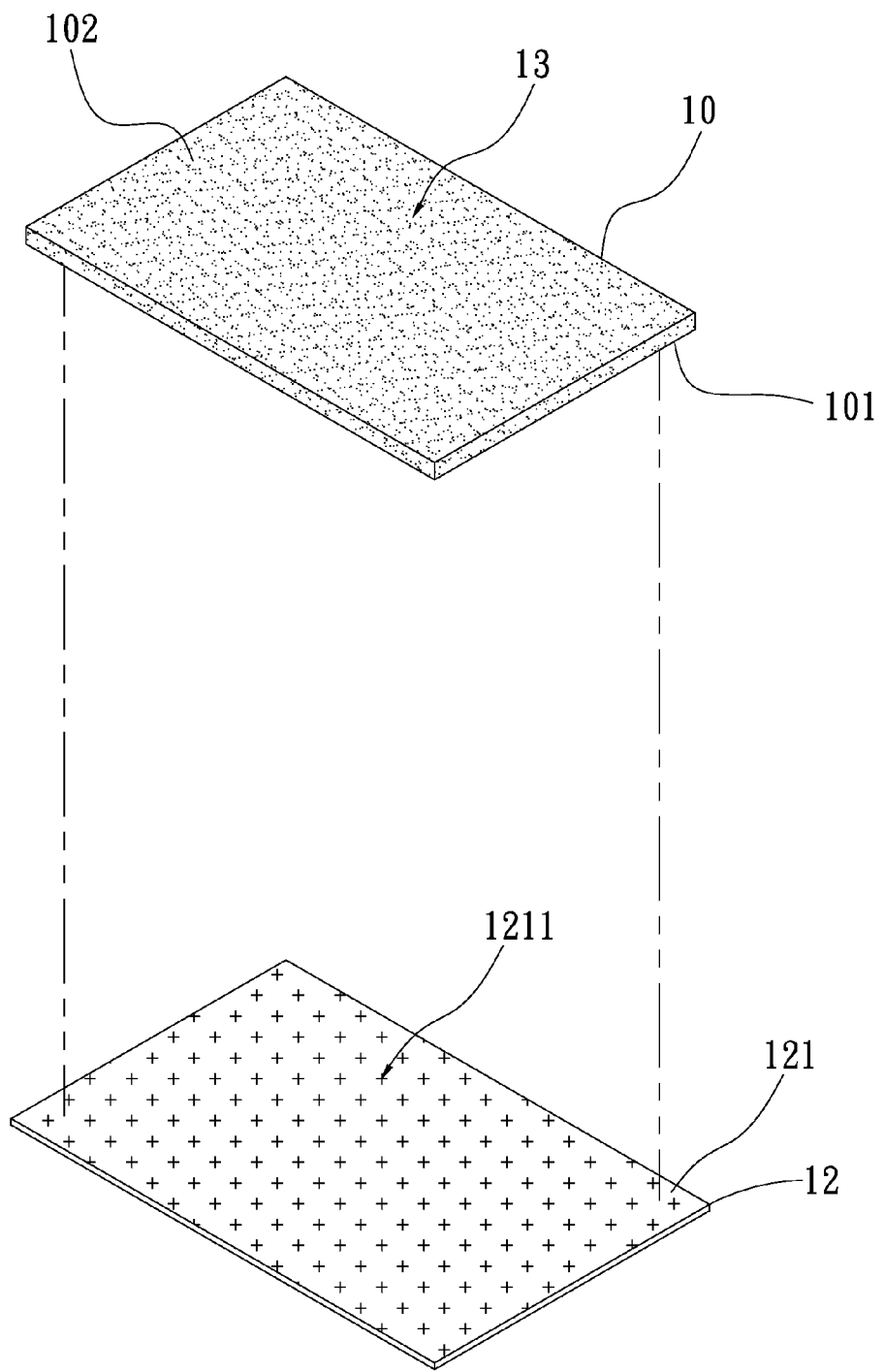
FIG. 2 is an exploded perspective view showing the first embodiment of the present invention.

Please refer to FIGS. 2 and 3. The reinforcement layer 13 is made of reinforced adhesive materials such as UV adhesive, polyurethane (PLT) adhesive, rubber, silicon, acrylic adhesive, glass resin, epoxy resin or composite materials. The reinforcement layer 13 is formed on the periphery and the second side surface 102 of the glass substrate 10 for filling the micro-cracks or chippings formed on the periphery and the second side surface 102 of the glass substrate 10 to thereby increase the strength of the glass substrate 10. In this way, the second side surface 102 can be made more flat, shining and smooth.

According to the present invention, the reinforcement layer 13 is formed on the second side surface 102 and the periphery of the glass substrate 10. In this way, the strength of the glass can be increased greatly. Further, the surface of the glass can be made more flat, shining and smooth.

The reinforcement structure of the present invention can be applied to a display device or touch panel of various electronic products such as mobile communication devices, portable multi-medium players, satellite navigation devices, digital cameras, notebook computers, panel computers or the like.

Figure 4:
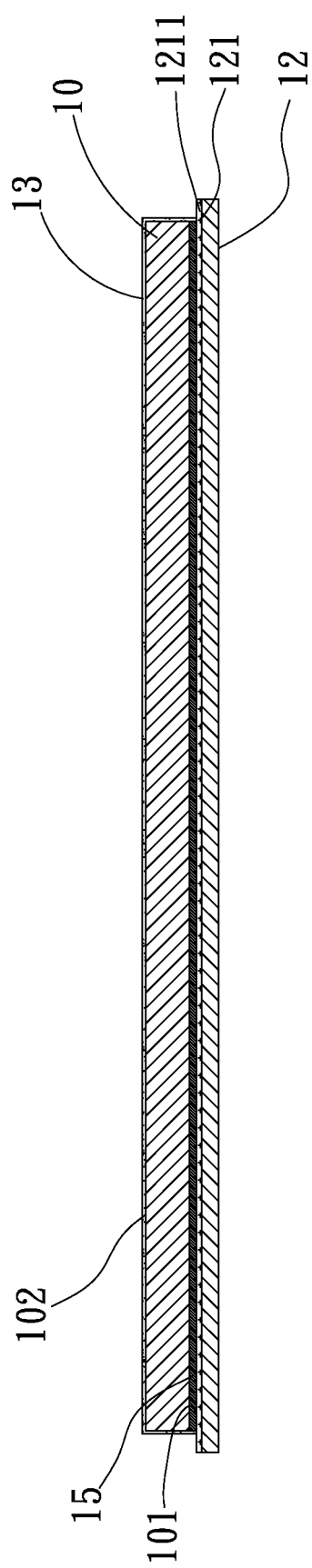
FIG. 4 is a cross-sectional view showing a second embodiment of the present invention.

Please refer to FIG. 4, which is a cross-sectional view showing the second embodiment of the present invention. The relationship and connection between the structural components of the present embodiment are substantially the same as those of the first embodiment, so that the redundant description thereof is omitted for clarity. The difference between the second embodiment and the first embodiment lies in that: the glass substrate 10 is provided with an electrical conductive layer 15. In the present embodiment, the electrical conductive layer 15 is made of Indium Tin Oxide (referred to as ITO hereinafter), but it is not limited thereto. The electrical conductive layer 15 is formed on the first side surface 101 of the glass substrate 10 by a sputtering process. The protective film 12 is adhered to the first side surface 101 and the electrical conductive layer 15 for protecting the electrical conductive layer 15.

Figure 5A:
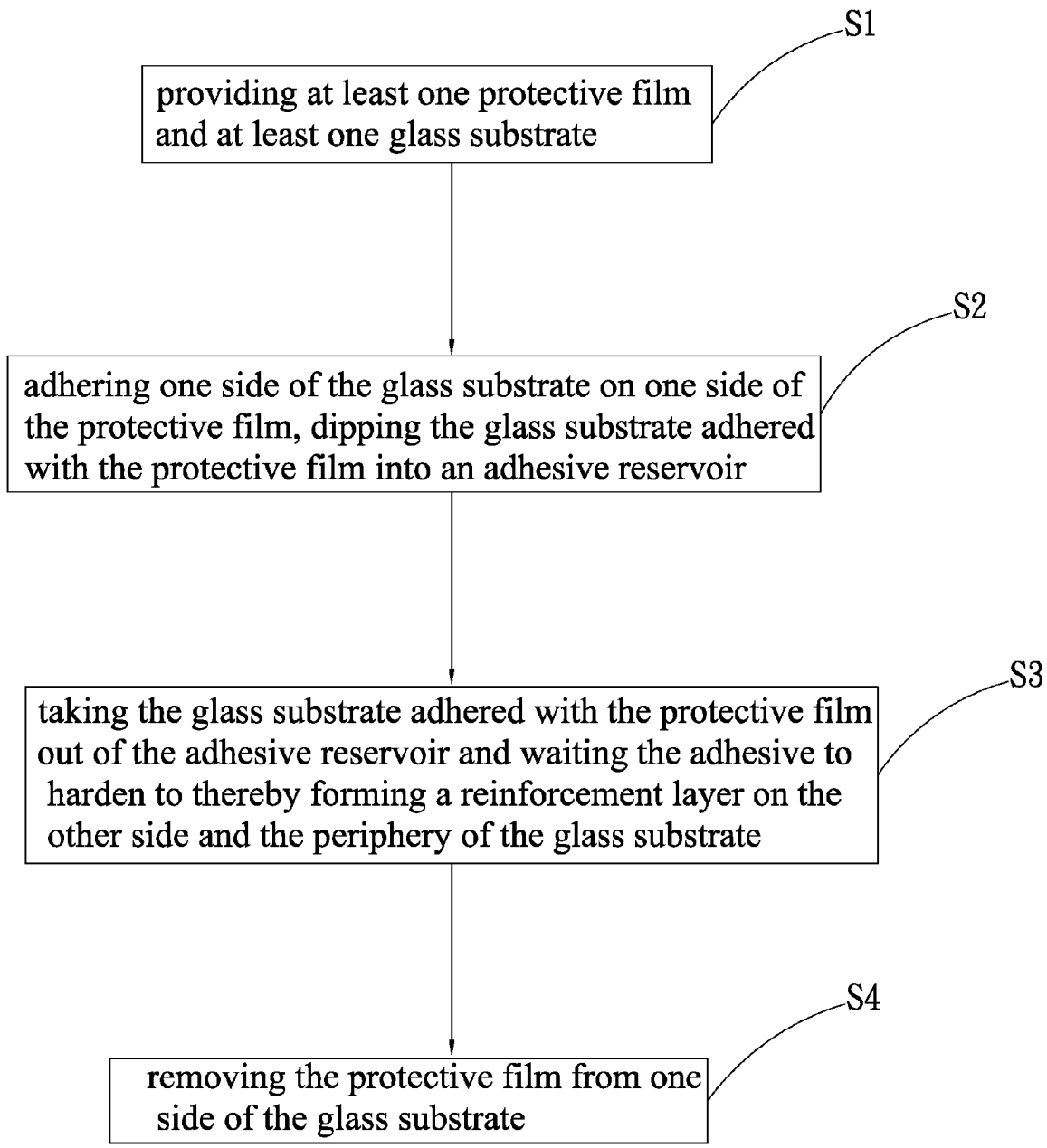
FIG. 5A is a flow chart showing a third embodiment of the present invention.
Figure 5B:
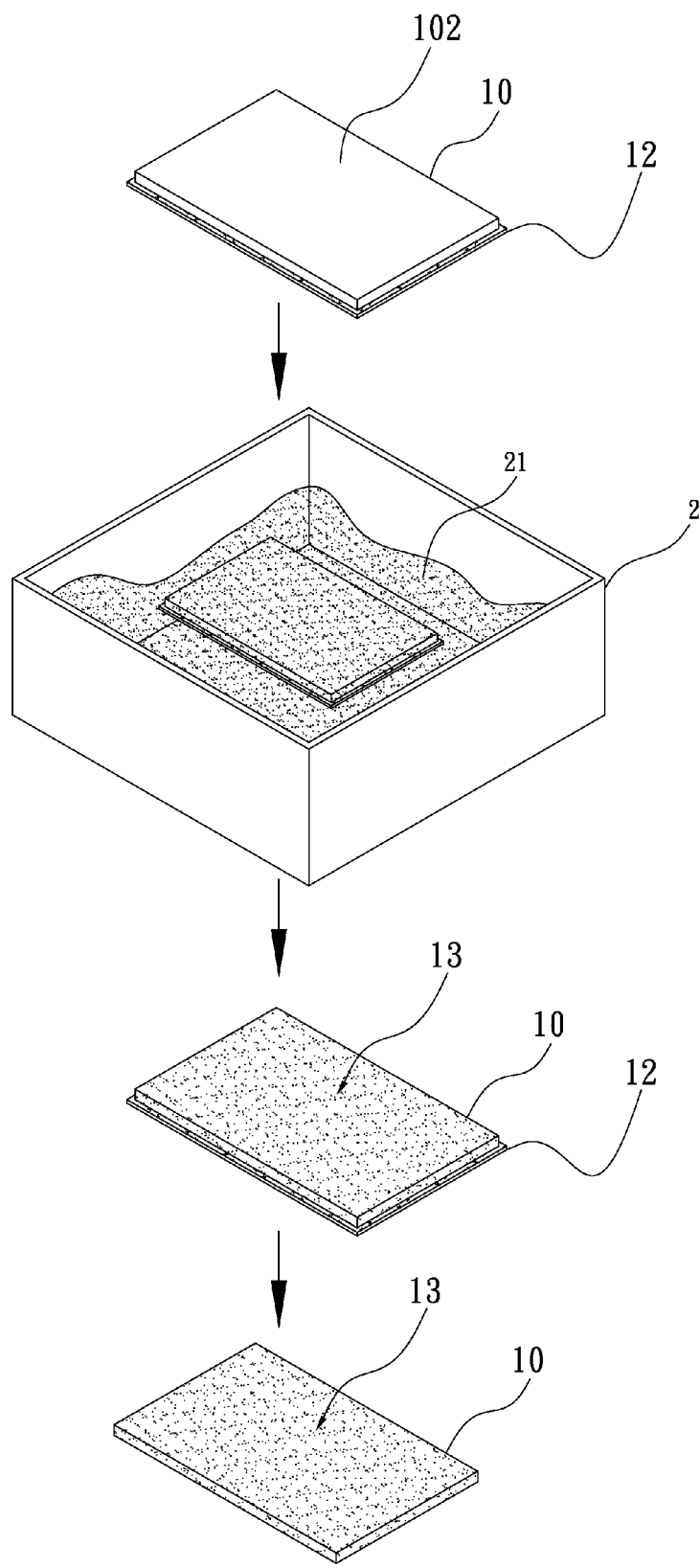
FIG. 5B is a schematic view showing the third embodiment of the present invention.

Please refer to FIGS. 5A and 5B showing the flow chart of the third embodiment of the present invention. Please also refer to FIGS. 1 to 3. The present embodiment provides a method for reinforcing a glass of a touch panel, which includes steps as follows:

(S1) providing at least one protective film and at least one glass substrate;

In the step S1, at least one protective film 12 and at least one glass substrate 10 are provided. In the present embodiment, the surface area of the protective film 12 is larger than the area of a surface of the glass substrate 10 to be adhered to the protective film 12, but it is not limited thereto. The surface area of the protective film 12 may be equal to the area of a surface of the glass substrate 10 to be adhered to the protective film 12.

(S2) adhering one side of the glass substrate on one side of the protective film, and dipping the glass substrate adhered with the protective film into an adhesive reservoir;

In the step S2, one side (i.e. the first side surface 101) of the glass substrate 10 is adhered to one side (i.e. the adhesion surface 121) of the protective film 12, so that the glass substrate 10 and the protective film 12 can be adhered together. Then, the glass substrate 10 adhered with the protective film 12 is dipped into an adhesive reservoir 2.

(S3) taking the glass substrate adhered to the protective film out of the adhesive reservoir and waiting the adhesive to harden, thereby forming a reinforcement layer on the other side and the periphery of the glass substrate;

In the step S3, the glass substrate 10 adhered with the protective film 12 is taken out of the adhesive reservoir 2. After the adhesive 21 on the other side (i.e. the second side surface 102) and the periphery of the glass substrate 10 is hardened, a reinforcement layer 13 is formed on the second side surface 102 and the periphery of the glass substrate 10. The reinforcement layer 13 is made of reinforced adhesive materials such as UV adhesive, polyurethane adhesive, rubber, silicon, acrylic adhesive, glass resin, epoxy resin, composite materials and the like.

(S4) removing the protective film from one side of the glass substrate;

In the step S4, the protective film 12 on one side (i.e. the first side surface 101) of the glass substrate 10 is removed from the glass substrate 10.

By the present method, the strength of the glass can be increased. Further, the surface of the glass can be made more flat, shining and smooth with a reduced cost.

According to the above, the present invention has advantageous features in comparison with prior art:

(1) the present invention has an increased strength;

(2) the surface of the present invention is made more flat, shining and smooth;

(3) the present invention has an reduced cost.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A reinforcement structure for a glass of a touch panel, including:

at least one glass substrate, provided with a first side surface and a second side surface opposite to the first side surface;

at least one protective film, arranged opposite to the glass substrate, the protective film having an adhesion surface adhered to the first side surface;

a reinforcement layer, formed on the periphery and the second side surface of the glass substrate; and wherein the glass substrate is provided with an electrical conductive layer, the electrical conductive layer is formed on the first side surface, so that the protective film can cover the first side surface and the electrical conductive layer.

2. The reinforcement structure for a glass of a touch panel according to claim 1, wherein the adhesion surface has an adhesive layer that can be adhered repeatedly, the adhesive layer can be adhered onto the first side surface repeatedly.

3. The reinforcement structure for a glass of a touch panel according to claim 1, wherein the reinforcement layer is made of a reinforced adhesive material selected from any one of UV adhesive, polyurethane adhesive, rubber, silicon, acrylic adhesive, glass resin, epoxy resin and composite materials.

4. The reinforcement structure for a glass of a touch panel according to claim 1, wherein the surface area of the protective film is larger than the area of a surface of the glass substrate to be adhered to the protective film.

5. The reinforcement structure for a glass of a touch panel according to claim 1, wherein the surface area of the protective film is equal to the area of a surface of the glass substrate to be adhered to the protective film.

* * * * *